Figure 1:
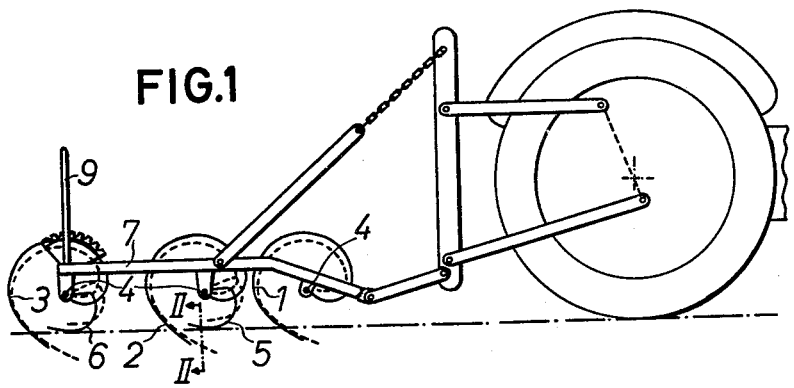

April 13, 1965  O. NJA  3,177,951
RUNNERS FOR AGRICULTURAL IMPLEMENTS
Filed June 4, 1963

3,177,951
RUNNERS FOR AGRICULTURAL IMPLEMENTS
Olav Nja, Kvernaland, Norway, assignor to Kvernelands
Fabrikk A/S, Kvernaland, Norway
Filed June 4, 1963, Ser. No. 285,483
Claims priority, application Norway, July 14, 1962,
145,113
1 Claim. (Cl. 172—244)

The present invention relates to improvements in runners for agricultural implements of the type comprising a frame carried by said runners at a certain distance from the soil when the implement is in operative position. Especially so-called tractor hitched spring-harrows are provided with runners of this type. The previously known runners for the purpose here intended have the shape of a shoe placed at the front of the implement or, possibly, at the rear thereof. A drawback consists in that the movements of the harrow will become rather unsettled, because the runners, especially the front ones, are hauled over unharrowed soil having irregularities. If, by way of example, the runner enters a depression the prongs of a spring harrow may enter undesirably downwards into the soil, and on the contrary the harrow prongs will get a too small operation depth when one or more runners are passing elevated portions. The object of the present invention primarily is to provide a runner improvement in which said drawback is avoided, so as to achieve a harrow or a corresponding agricultural implement which will move much more steady than before, inter alia by being better guided in sidewards directions, and this is achieved by the runners being placed directly rearwards of a harrow prong or another operative organ, so that the runner will be hauled over freshly conditioned field, where such irregularities, say humps or projections, have been harrowed away. By providing the runner with a cross section shape, substantially corresponding to the shape of the soil, as such shape appears just behind the operative organ, a far better guiding sideways of the implement is obtained, than what may be achieved by the presently known embodiments.

In the previously known spring-harrows the harrow prongs are attached to booms, which extend transversely of the implement and are tiltable, so that the prongs may be adjusted for their operation depths. The harrow prongs have the shape of somewhat spiral-like springs, the free ends of which extend down into the soil, when the harrow is operating and it is evident that such a harrow prong will have a distinct angular position in relation to the movement direction, which is the most effective one for treating of the soil. Every other position, at which the angle in relation to the direction of movement is greater or less, will give a less effective operation, and as mentioned above depth operating control of the prongs of the known spring harrows is obtained by rotating or swinging of the boom with prongs thereon in the desired direction. This means that if it is desired for instance that the prongs shall penetrate to a smaller depth, said prongs must be pivoted so far that the angle between the prong point and the direction of movement deviates very much from said most effective angle, and another object of the present invention therefore consists in providing a simple adjustment device, adapted to cause adjustment of the operation depth of the harrow prongs by rotating, as before indicated, the prong boom with the prongs thereon, but where a substantially greater depth control is achieved by a far smaller swinging or rotation of the boom and its prongs, away from that angle which gives the most effective operation. According to the invention this is achieved thereby that said previously mentioned runners are attached to the prong boom and are swung or rotated together with the boom and the harrow prongs. The runners are, moreover, placed eccentrically about the prong booms and are of such shape that when the boom and the prongs thereon are rotated in order to increase the operation depth of the prongs, the runners, which are swung together with the booms, will lower the entire implement; inversely the runners will raise the implement when the prongs are swung in order to decrease the operation depth.

Thus the invention relates to an arrangement in runners supporting agricultural implements having organs for treatment of the soil, and the invention is substantially characterized thereby that one or more runners is or are situated rearwards to and in line with an operative organ.

In a preferred embodiment of the invention the runner has a cross sectional shape that approximately corresponds to that of the furrow which the operation organ produces in the soil, and a further characterizing feature of the invention consists therein that the runner in connection with spring harrows comprising harrow sprongs attached to a rotatable boom, have the runner provided on such a prong boom in line with a preceding prong, and may be rotated together with said boom for adjustment of the operation depth of the harrow prongs.

In a suitable embodiment the runner is eccentrically arranged in relation to the prong boom, so that the prong boom is raised or lowered by means of the runner, upon rotation thereof.

An embodiment of the invention is illustrated by the drawing, where

FIGURE 1 is a side view of a spring harrow, and

Figure 2:
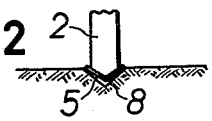

FIGURE 2 shows on a larger scale a section taken along the line II—II of FIGURE 1. The harrow is, as shown, provided with harrow prongs 1, 2 and 3. Said prongs are situated upon prong booms, which usually are of tube shape and extend transversely of the implement and are rotatable in the journals 4. Upon the prong booms are also, in the embodiment here chosen, provided runners 5, 6 which support the implement frame 7 at a certain distance from the soil. According to the invention said runners 5, 6 are placed directly to rear of and in line with a preceding harrow prong. Thus the runner 5, see FIG. 2, will be placed directly in rear of the harrow prong 1, as seen in the operation direction of the harrow. Thereby the runner 5 follows the groove or furrow formed in the soil rearwards of the harrow prong 1 and which is indicated at 8 on FIG. 2. As will be seen the runner 5 of FIG. 2 gets a good guidance in sideways directions and the harrow will get a quiet motion when operating, since the furrow 8 behind the harrow prong 1 will be far more regular than the non-harrowed soil, which precedes the harrow prong 1.

What here is said also applies to the runner 6, which follows the harrow prong 2, and said runner and prong preferably are placed in another plane than that of the runner 5 and the prong 1.

Control of the operation depth is effected by means of a lever 9, which may cause simultaneous rotation of all of the prong-carrying booms, whereby the prongs may be swung to operate deeper or less deep in the soil. Due to the fact that in accordance with the invention the runners 5, 6 are eccentrically arranged in relation to the rotation axis of the prong-carrying booms, and rotate together with these, the runners 5 and 6 will, however, raise or lower the implement frame 7, whereby a substantially smaller swinging movement of the prongs 1, 2, 3 becomes necessary for achievement of the desired depth regulation, as compared with such swinging movement as is necessary in the previously known embodiments.

Because the necessary swinging motion of the harrow prongs has thus become substantially reduced, the depth control desired may be obtained by positioning the ends of the harrow prongs nearer to the angle relative to the direction of movement which will give the best effectivity degree, contrary to previously when—in order to obtain the desired depth control—it was necessary to deviate rather much from said angle.

The example described serves only to illustrate the invention and forms no limitation thereof, since other embodiments are well adaptable within the frame of the invention. The runner here described may thus with advantage be substituted by runners of known types on implements in which are commonly made use of.

I claim:

An agricultural implement comprising a frame, at least two booms rotatably mounted under said frame, said booms being parallel to each other and extending transversely of said frame in a substantially horizontal plane, means for rotating said booms simultaneously to the same extent and in the same direction, spiral spring teeth eccentrically mounted on at least the front of said booms with their free ends adapted to engage the soil under said frame, runners mounted on at least the rear of said booms with their runner surfaces positioned to be in constant contact with the soil under said frame to the rear of and in longitudinal alignment with said teeth, said runners being eccentrically mounted so that rotation of the boom to which they are attached will raise or lower their runner surfaces whereby when said booms are rotated to raise or lower the free ends of said spiral spring teeth said runner surfaces will be lowered or raised respectively to permit greater penetration of said free ends into the soil, said runners being V-shaped and being of the same width as the bottoms of the grooves cut by said teeth.

References Cited by the Examiner

UNITED STATES PATENTS

| | | | |
|---|---|---|---|
| 456,426 | 7/91 | Nellis | 172—389 |
| 1,146,072 | 7/15 | Holdridge | 172—707 X |
| 1,935,416 | 11/33 | Reynolds | 172—390 X |
| 2,005,555 | 6/35 | Morkovski | 172—292 |
| 2,769,385 | 11/56 | Hahn | 172—361 X |

T. GRAHAM CRAVER, *Primary Examiner.*